UNITED STATES PATENT OFFICE.

ALBERT HESSE, OF WILMERSDORF, GERMANY.

SOLUTION OF PERFUMES AND METHOD OF MAKING THE SAME.

1,017,669.  Specification of Letters Patent.  Patented Feb. 20, 1912.

No Drawing.  Application filed June 13, 1910. Serial No. 566,673.

*To all whom it may concern:*

Be it known that I, ALBERT HESSE, a subject of the German Emperor, and resident of Wilmersdorf, in the Kingdom of Prussia, German Empire, have invented new and useful Improvements in Solutions of Perfumes and Methods of Making the Same, of which the following is a full, clear, and exact specification.

This invention is based on my discovery that the alkyl and aryl esters of phthalic acid, which have hitherto only been described in scientific literature, are of great technical interest since they are excellent solvents for various substances. I have found that these esters can dissolve ethereal oils and other natural or artificial perfumes or mixtures of the same; their dissolving capacity is remarkably great, even a small quantity of the ester being able to dissolve a considerable quantity of the substance in question. The necessary proportion of the solvent depends on the temperature necessary for the particular application.

The phthalic acid esters may be used in conjunction with each other or with other solvents, whereby the solvent capacity of the latter is in many cases enhanced. The phthalic acid esters, when used for manufacturing solutions of odoriferous substances, give the advantage that the natural or artificial perfumes or mixtures thereof are fixed and their irregular evaporation is prevented. Further, by using phthalic acid esters as solvents, ethereal oils, which are sparingly soluble in alcohol can be dissolved.

Examples.

1. 5 parts of Peru balsam are dissolved in 40 parts of phthalic acid benzyl ester by application of gentle heat.

2. 1 part of lemon oil and 2 parts of Portugal oil (orange peel oil) are dissolved to a turbid solution in 20 parts of alcohol. 8 parts of dimethyl phthalate are added, whereupon the solution becomes quite clear and can receive an addition of 2–3 parts of water without becoming turbid.

3. 1 part of artificial musk, so-called ketone-musk, (*i. e.* the nitro derivatives of butyl tolyl ketone, butyl xylyl ketone, isobutyrylbutyl xylyl ketone) is heated to about 60–70° C. with 5 parts of dimethyl phthalate. On cooling the solution a part of the dissolved musk separates. This can be avoided by adding a larger proportion of the solvent to the solution while heated.

4. 1 part of vanillin is rubbed with 10 parts of cold phthalic acid ethyl ester, until dissolved.

5. 5 parts of ylang-ylang oil, 1 part of hyacinthin (brom-styrol), 0.5 part of vanillin, 0.25 part of coumarin, 0.5 part of rose oil, 1 part of neroli oil, 0.5 part of ionone and 1 part of bitter almond oil are dissolved in 1000 parts of a jasmine pomatum infusion (a solution obtained by agitating or shaking jasmine pomatum with alcohol) and mixed with 0.05 parts each of civet, amber and musk each dissolved in 30 parts of dimethyl phthalate. Instead of 1000 parts of jasmine pomatum infusion a solution of 1 part of jasmine oil in 500 parts of dimethyl phthalate can be used, a perfume free from alcohol being thus obtained.

6. 5 parts of coumarin are heated with 20 parts of methyl phthalate and 75 parts of alcohol up to 50° C.

7. 10 parts of anise seed oil are heated with 90 parts of ethyl phthalate up to 80° C.

8. 2 parts of rectified bay oil are heated with one part of ethyl phthalate, 2 parts of methyl phthalate and 20 parts of alcohol up to 60° C. A small quantity of water may, if desired, be added to the solution without rendering it turbid.

What I claim is:—

1. As a new composition of matter, a solution of an organic perfume containing a phthalic acid ester as a solvent.

2. As a new composition of matter, a solution of an organic perfume containing a phthalic acid ester and alcohol as solvents.

3. As a new composition of matter, a solution of an organic perfume containing a phthalic acid ester, alcohol and water as solvents.

4. As a new composition of matter, a solution of an ethereal oil containing a phthalic acid ester as a solvent.

5. As a new composition of matter, a solution of an ethereal oil containing a phthalic acid ester and alcohol as solvents.

6. As a new composition of matter, a solution of an ethereal oil containing a phthalic acid ester, alcohol and water as solvents.

7. The process of manufacturing solutions of organic perfumes, consisting in acting on said substances with a phthalic acid ester and another solvent.

8. The process of manufacturing solutions of organic perfumes, consisting in heating said substances with a phthalic acid ester and another solvent.

9. The process of manufacturing solutions of ethereal oils, consisting in acting on said oils with a phthalic acid ester and another solvent.

10. The process of manufacturing solutions of ethereal oils, consisting in heating said oil with a phthalic acid ester and another solvent.

In testimony that I claim the foregoing as my invention, I have signed my name in presence of two subscribing witnesses.

ALBERT HESSE.

Witnesses:
 HENRY HASPER,
 WOLDEMAR HAUPT.